Jan. 3, 1933.  A. DAHLSTROM  1,893,469

AUTOMATIC PHONOGRAPH

Filed May 8, 1930   7 Sheets-Sheet 1

Inventor:
Arvid Dahlstrom
By Williams, Bradbury, McCaleb & Hinkle
Attys.

Jan. 3, 1933.  A. DAHLSTROM  1,893,469
AUTOMATIC PHONOGRAPH
Filed May 8, 1930  7 Sheets-Sheet 2

Inventor:
Arvid Dahlstrom
By Williams, Bradbury,
McCaleb & Hinkle
Attys.

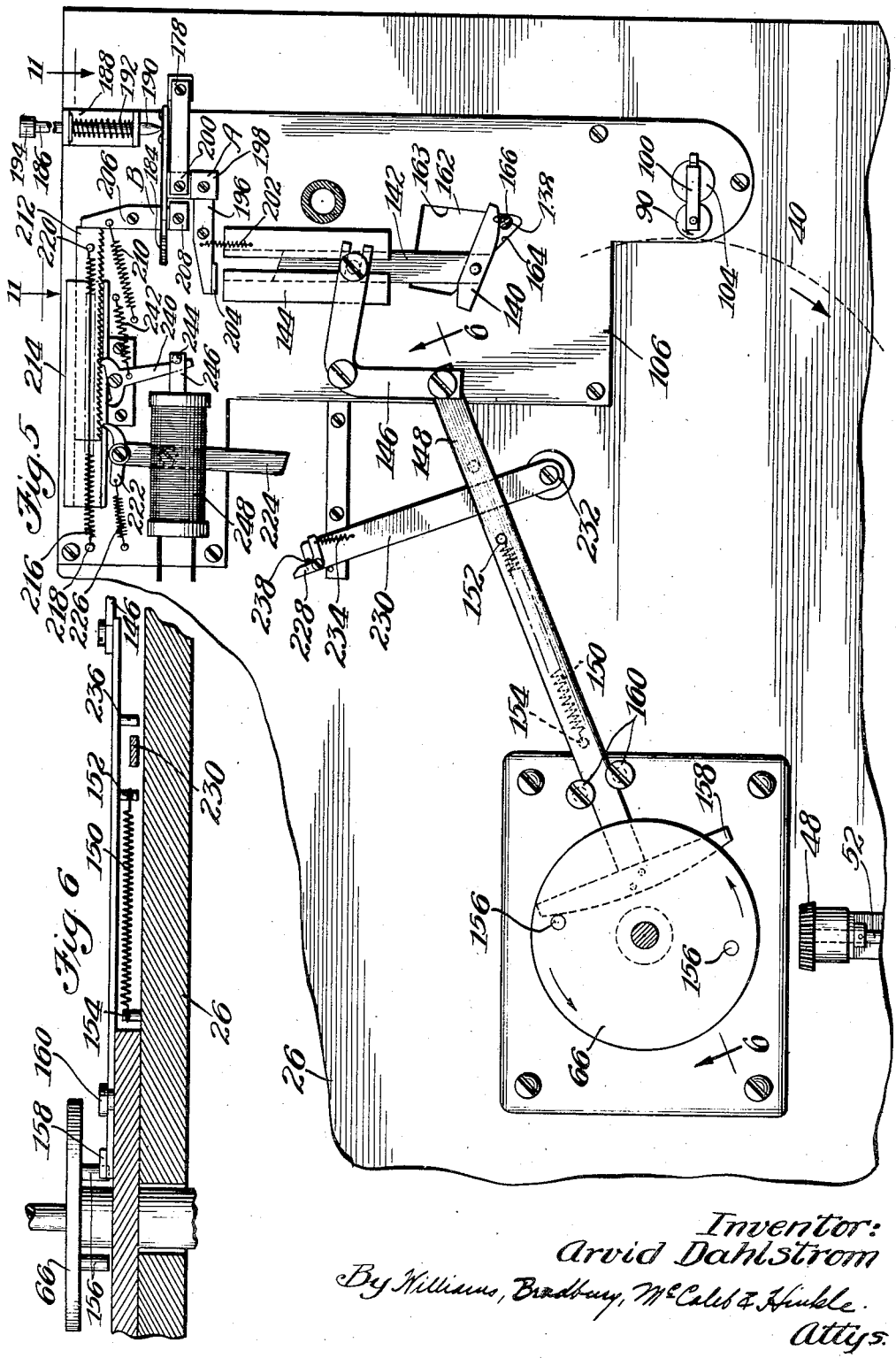

Jan. 3, 1933.  A. DAHLSTROM  1,893,469
AUTOMATIC PHONOGRAPH
Filed May 8, 1930  7 Sheets-Sheet 4
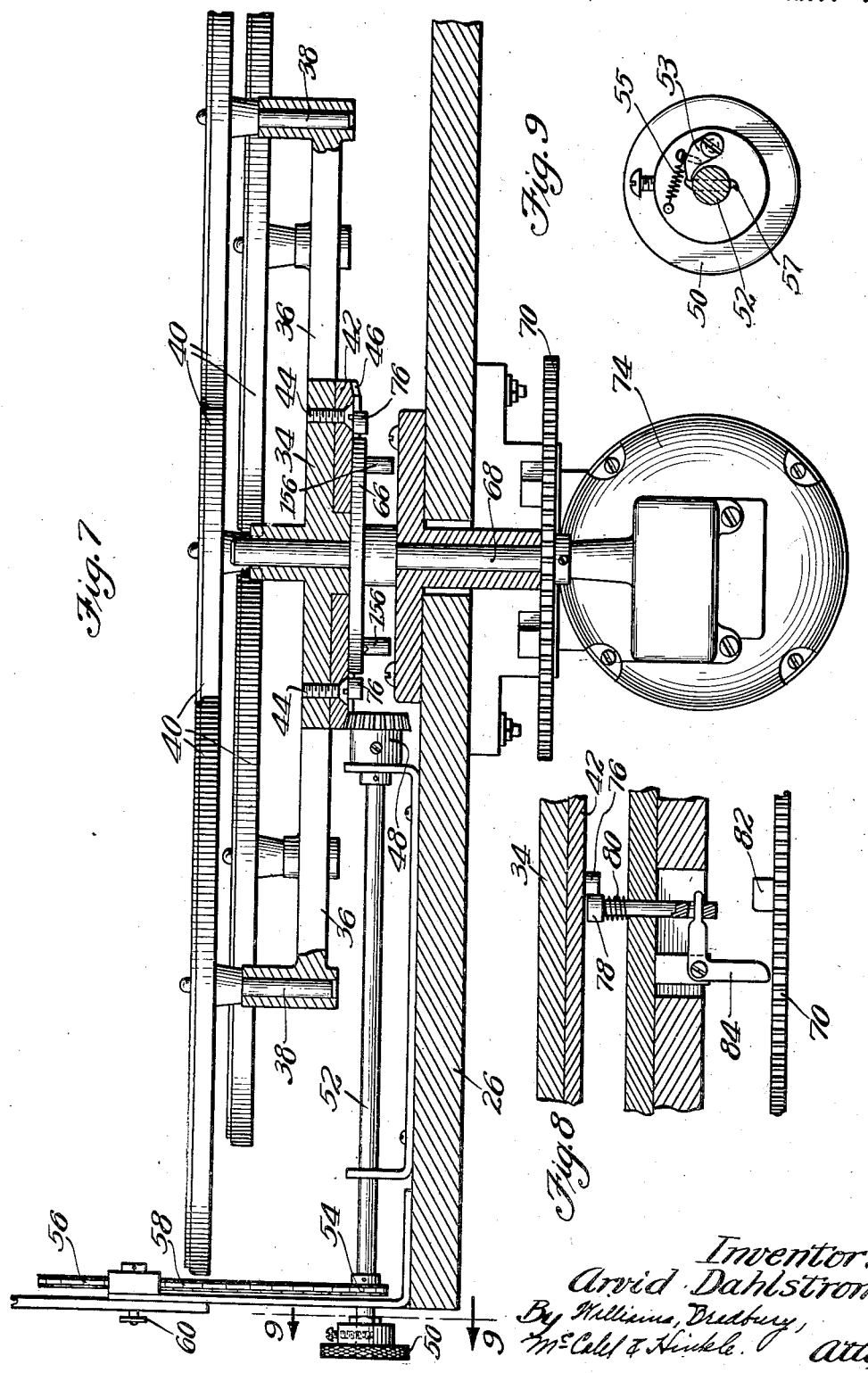

Jan. 3, 1933.  A. DAHLSTROM  1,893,469
AUTOMATIC PHONOGRAPH
Filed May 8, 1930  7 Sheets-Sheet 5
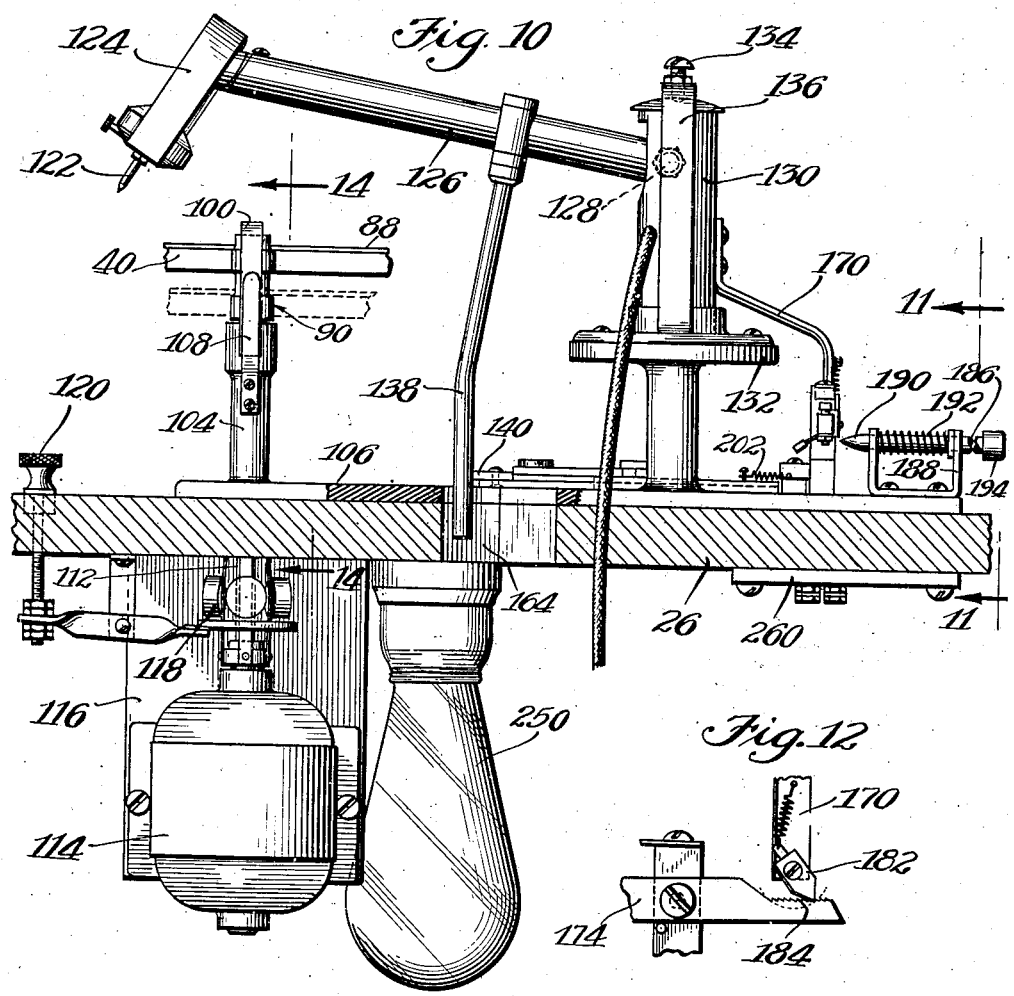
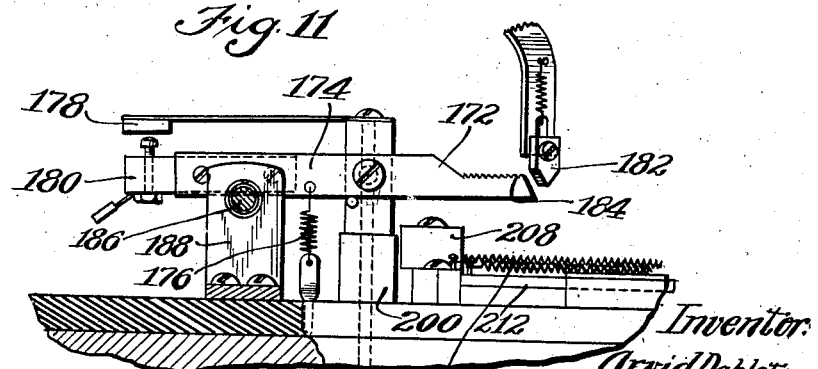

Jan. 3, 1933.  A. DAHLSTROM  1,893,469
AUTOMATIC PHONOGRAPH
Filed May 8, 1930  7 Sheets-Sheet 6
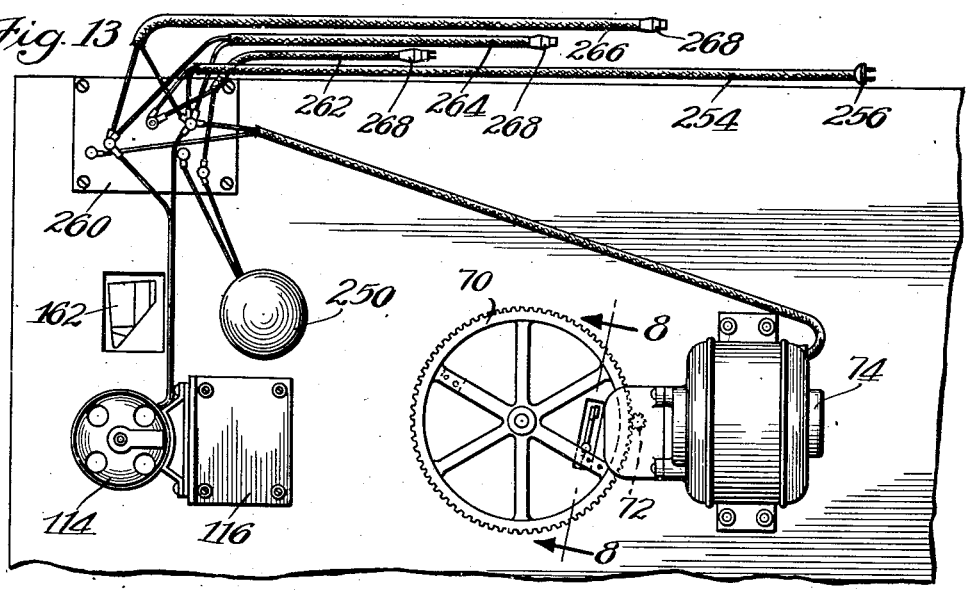
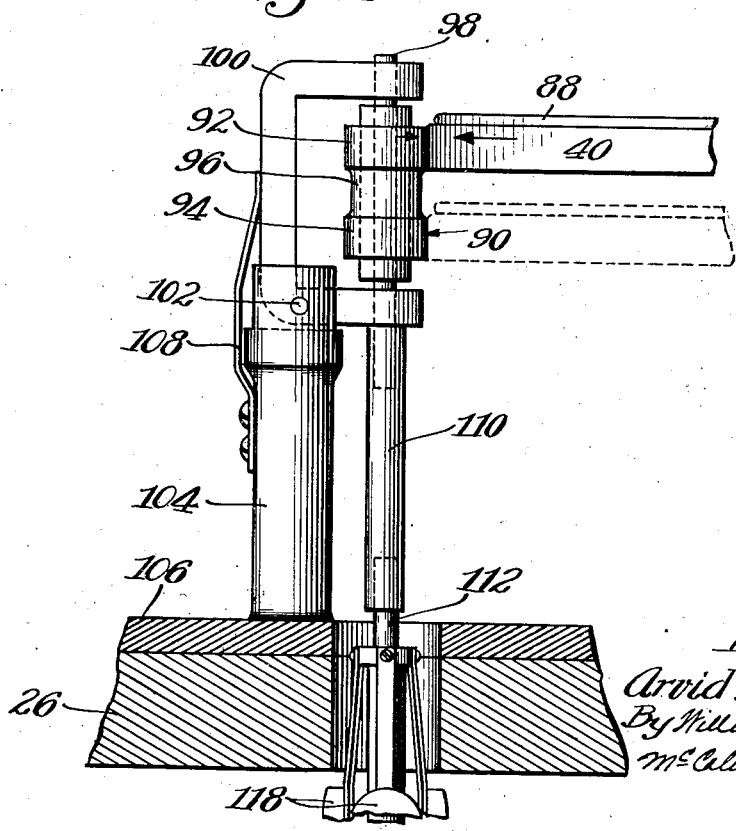
Inventor:
Arvid Dahlstrom
By Williams, Bradbury,
McCaleb & Hinkle
Attys.

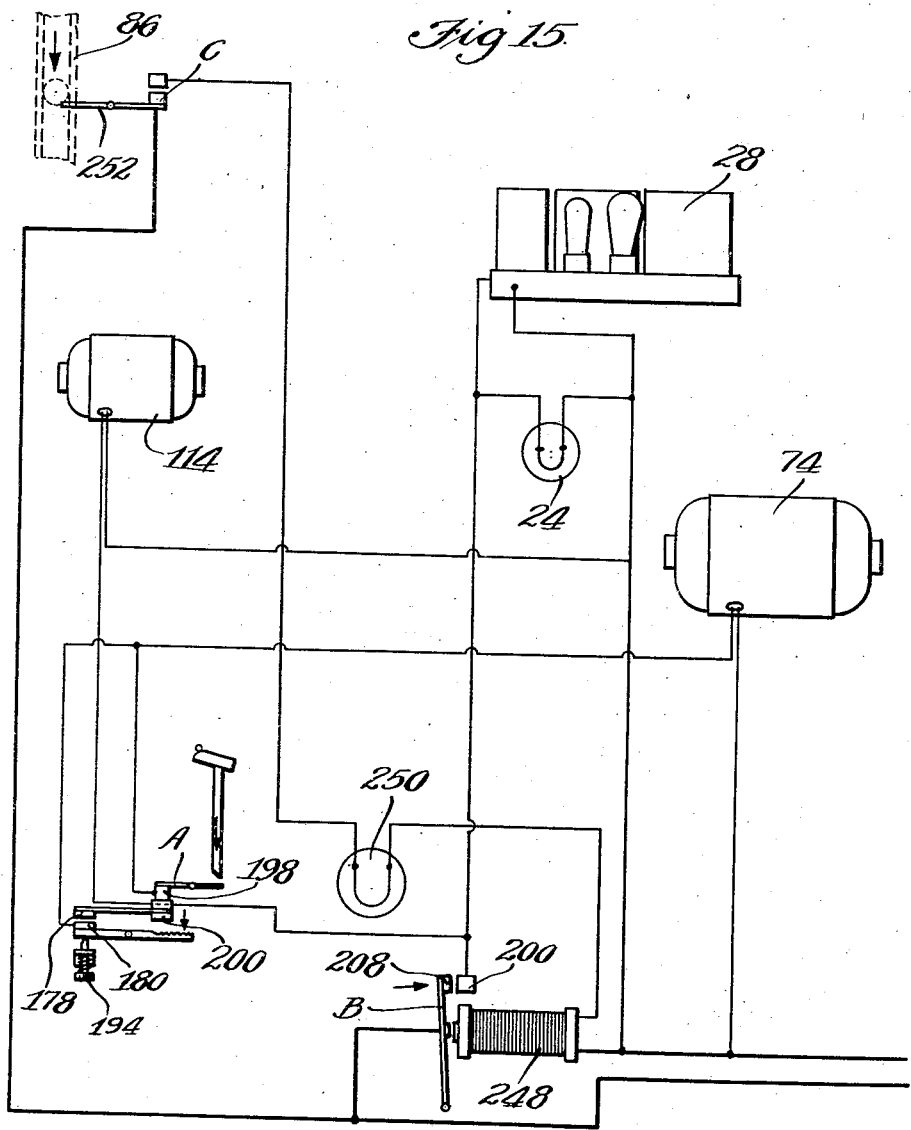

Patented Jan. 3, 1933

1,893,469

UNITED STATES PATENT OFFICE

ARVID DAHLSTROM, OF CHICAGO, ILLINOIS, ASSIGNOR OF ONE-THIRD TO FRITHIOF LANDBERG AND ONE-THIRD TO JUSTUS P. SEEBURG, BOTH OF CHICAGO, ILLINOIS

AUTOMATIC PHONOGRAPH

Application filed May 8, 1930. Serial No. 450,749.

My invention relates to automatic phonographs wherein I provide mechanism for holding a plurality of records, and automatic means for playing the records in seriatim or in any selected order at the option of the operator. In the preferred embodiment of my invention illustrated in this application the phonograph is controlled by coin-operated mechanism. It is to be understood, however, that where my new and improved phonograph is intended to be used in clubs and private homes the coin-operated mechanism may be dispensed with.

An object of my invention is to provide an automatic phonograph which has few parts, is economical to manufacture, and can be operated for long periods of time without either adjustments or repairs.

Another object of my invention is to provide a new and improved carrier for supporting the records.

Another object is to provide a new and improved mechanism for driving the records.

Another object is to provide improved means for applying the electrical pick-up mechanism to the record to be played and for removing the electrical pick-up mechanism from the record after the latter has been completed.

Another object is to provide an automatic phonograph which will operate with the various styles of records now in commercial use.

Another object is to provide an automatic phonograph having selector mechanism whereby the operator may select any record which he desires but in which the records will be automatically played in succession when the selector mechanism is not operated.

Other objects and advantages will be apparent as the description proceeds.

In the drawings,

Fig. 5 is a horizontal section taken on the line 5—5 of Fig. 2;

Fig. 6 is a vertical section taken on the line 6—6 of Fig. 5;

Fig. 7 is a vertical section taken on the line 7—7 of Fig. 3;

Fig. 8 is a vertical section taken on the line 8—8 of Fig. 13;

Fig. 9 is a detail view of the selector mechanism taken on the line 9—9 of Fig. 7;

Fig. 10 is a vertical section taken on the line 10—10 of Fig. 3;

Fig. 11 is a vertical section taken on the line 11—11 of Fig. 5 and showing part of the stop mechanism in detail;

Fig. 12 shows part of the mechanism of Fig. 11 in a different position;

Fig. 13 is a horizontal section taken on the line 13—13 of Fig. 2;

Fig. 14 is a view of the record driving mechanism taken on the line 14—14 of Fig. 10; and Fig. 15 is a wiring diagram.

Figure 1:
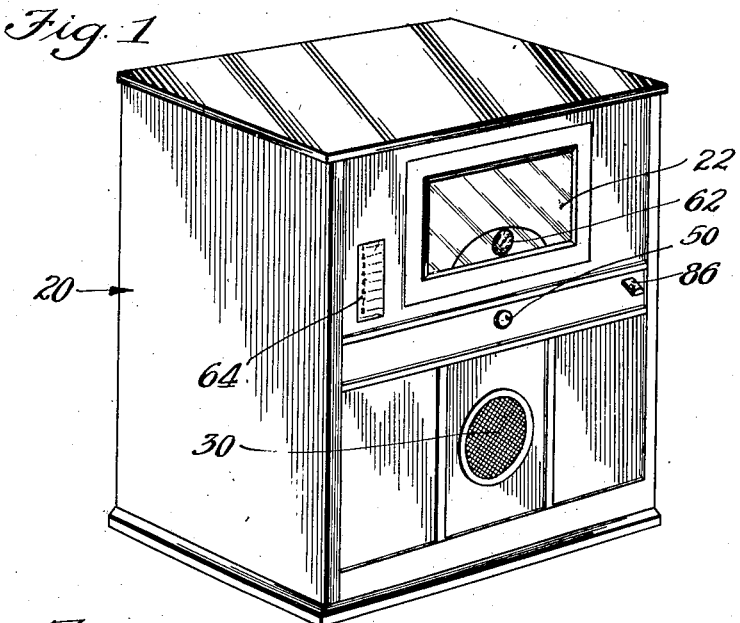
Fig. 1 is a perspective view of a cabinet containing my automatic phonograph.

Referring to the drawings, I have shown my invention enclosed in a cabinet 20 which may be of any desired type and is preferably given a shape and finish which cause it to harmonize with the surroundings in which it is to be placed. In a preferred type of cabinet, which is especially adapted to contain the coin controlled form of my automatic phonograph, the operating mechanism is completely enclosed in a locked cabinet so that the casual operator of the machine cannot interfere with or disarrange the operating mechanism. The front of the cabinet is provided with a window 22 which makes it possible to watch part of the operating mechanism, and I preferably mount a red lamp 24 in the cabinet above the operating mechanism, which lamp burns throughout the operation of the machine and serves the dual purpose of attracting attention and of providing sufficient light to make the operating mechanism visible under all conditions.

Figure 2:
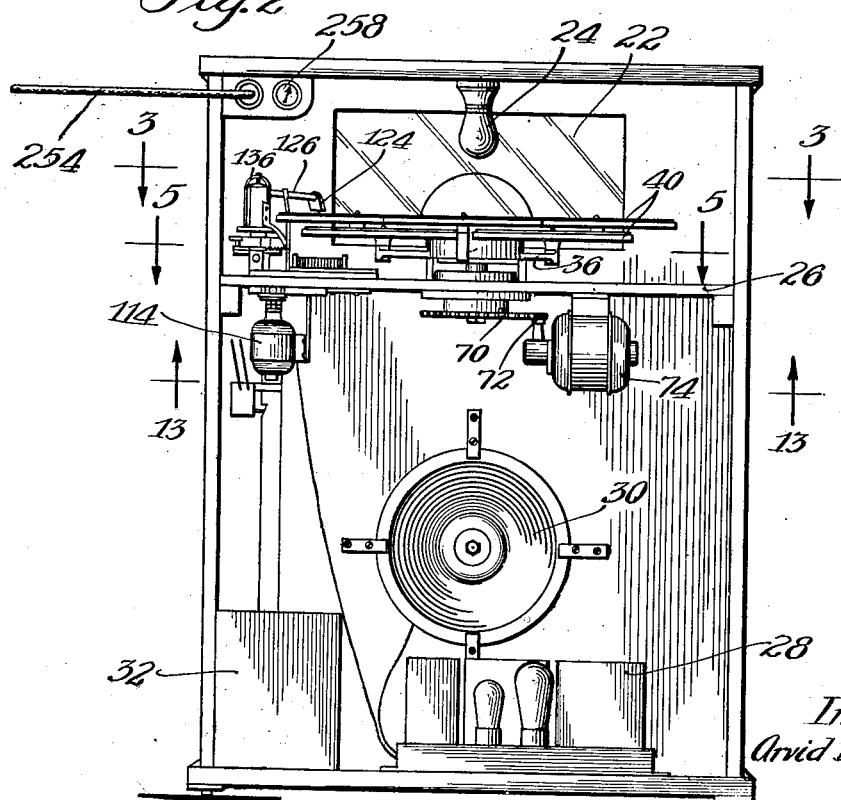
Fig. 2 is a sectional elevation of the mechanism shown in Fig. 1.

As shown in Fig. 2 of the drawings, the mechanism comprising my new and improved phonograph and the driving motors therefor, are carried upon a shelf 26 mounted in the upper part of the cabinet 20.

In the lower part of the cabinet I provide an electrical amplifying mechanism 28 having a loud speaker 30. This electrical amplifying mechanism may be of any well-known or preferred type and, if so desired, may contain radio receiving means which may be operated during idle periods of the phonograph mechanism. A coin receiver 32 is also located in the bottom of the cabinet 20 beside the electrical amplifying mechanism 28.

Figure 3:
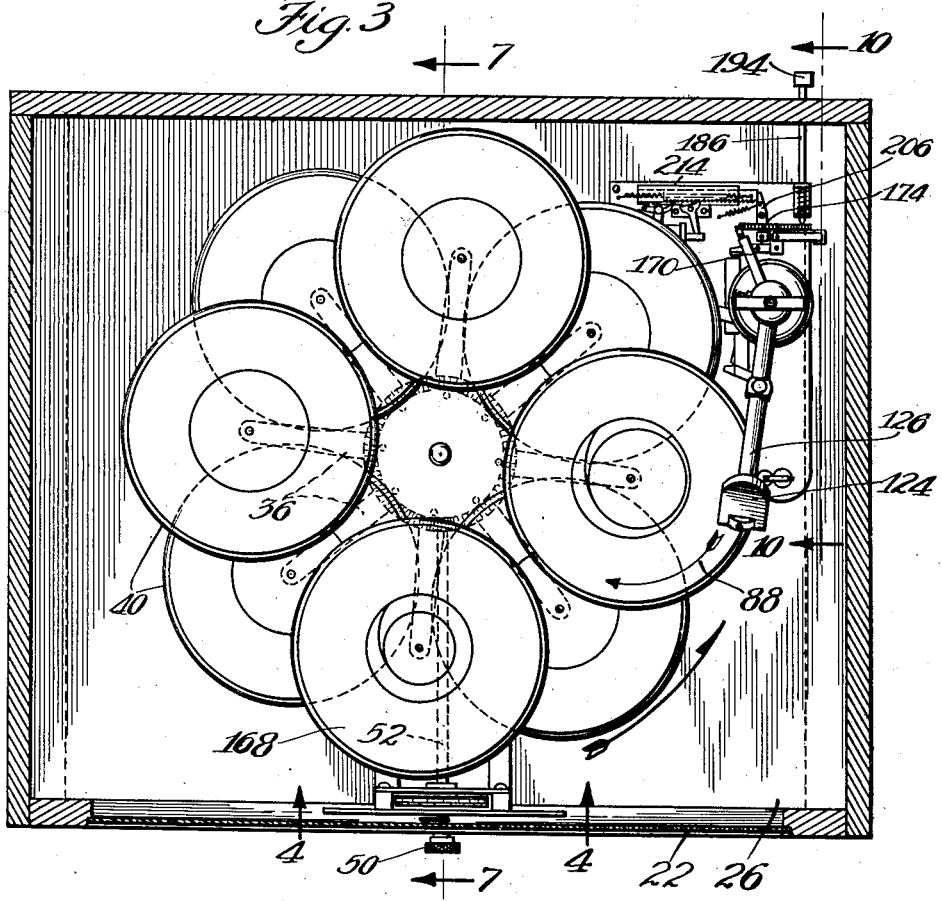
Fig. 3 is a horizontal section taken on the line 3—3 of Fig. 2.
Figure 4:
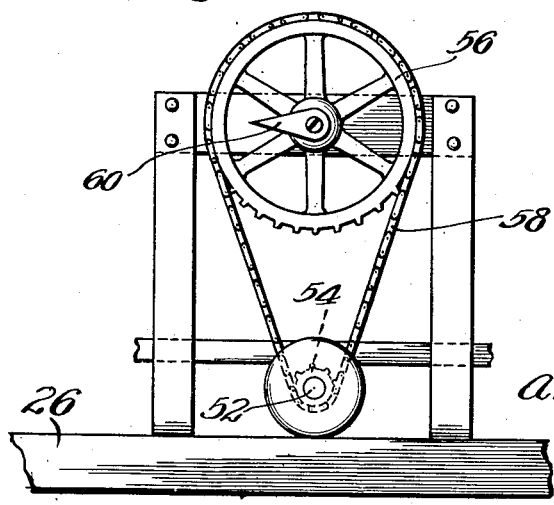
Fig. 4 is a detail view of the selector mechanism taken on the line 4—4 of Fig. 3.

As shown most clearly in Figs. 3 and 7, I provide a record carrier 34 provided with arms 36, each of which supports a turntable shaft 38 upon which is located a turntable 40. In the embodiment of my invention illustrated in the drawings, I have shown the record carrier as provided with eight turntable supporting arms, each alternate arm being adapted to hold its turntable at a higher elevation than and in overlapping relationship to the turntables carried by the intervening arms. It is to be understood, however, that I am not limited to a carrier having eight arms but that more or less arms may be used, as desired. Each of the turntables 40 is adapted to carry a disk record of any of the types now in common commercial use. The upper series of turntables is sufficiently elevated above the lower series of turntables so that the records on the lower series of turntables may easily be changed.

A ring 42 is secured to the lower side of the carrier 34 by screws 44 or any other suitable means and has teeth 46 which mesh with the teeth of the pinion 48 adapted to be rotated by a hand wheel 50 secured to the opposite end of a shaft 52 forming part of the selector mechanism. The shaft 52 also carries a gear 54 which is connected with a larger gear 56 by means of a chain 58. The gear 56 rotates a pointer 60 and causes the pointer to register with one of the numerals on the dial 62 mounted just inside of the window 22. This dial contains eight numbers, each number corresponding to one of the eight turntables supported by the carrier 34.

When records are placed upon the turntables a list 64 is prepared giving the name of each record opposite the number corresponding to the turntable on which the record is placed. By rotating the hand wheel 50 until the pointer 60 registers with the number corresponding to the number of the record which the operator desires to have played next, it is possible for the operator to select any record which he desires.

I prefer to arrange the hand wheel 50 so that it will rotate the carrier 34 in only one direction, and I accomplish this by the mechanism shown most clearly in Fig. 9. The hand wheel 50 is loosely mounted on the shaft 52. The hand wheel 50 carries a pivoted dog 53, the free end of which is urged against the shaft 52 by a spring 55, and when the hand wheel is operated in the proper direction this free end of the dog engages one end of a pin 57 extending through the shaft 52 and thereby rotates the shaft. When the hand wheel is rotated in the opposite direction, the free end of the dog passes idly over the ends of the pin 57 and the shaft 52 is not rotated. This arrangement makes it impossible for the operator to oscillate the carrier 34 rapidly and possibly damage the mechanism by the rapid oscillation of this relatively heavy mechanism.

The carrier 34 rests upon a plate 66 keyed to a shaft 68 which is driven through gears 70 and 72 by a carrier motor 74. The plate 42 has eight depending lugs 76, one for each of the record turntables, and these lugs cooperate with a stop 78 (Fig. 8) normally held in upper position by a spring 80. When the machine is at rest the stop 78 is retracted by a cam 82 carried on the gear wheel 70 coming in contact with one arm of a bell crank lever 84, the other arm of which projects through an opening in the lower end of the stop 78 and serves to move the stop downwardly against the force of the spring 80.

When the stop 78 is thus retracted, the record carrier can be moved to any desired position by the selector mechanism, and if the selector mechanism is not used the record carrier will be advanced one turntable each time the machine is stopped and started and thus play the records in seriatim. This automatic advance of the record carrier results from the frictional drive of the record carrier by the plate 66 upon which it rests. Prior to the release of the stop 78 by the cam 82, when the machine is started by dropping a suitable coin in the upper end of the coin chute 86 (Fig. 1) the turntable, upon which the record to be played is located, is moved into the position occupied by the record and turntable indicated by the reference numeral 88 in Fig. 3, in which position the down-turned flange of the turntable contacts with a driving member 90 shown most clearly in Fig. 14. This driving member 90 is preferably of rubber or other suitable material and has two enlarged driving surfaces 92 and 94 separated by a reduced portion 96. I have found that the disk records in common usage frequently differ very slightly in diameter although supposed to be of the same size, and I have designed my new and improved driving member so that the records on the lower series of turntables may slightly overlap the edges of their turntables without coming in contact with the driving member 90.

The driving member 90 is mounted on a shaft 98 mounted in a U-shaped support 100 pivoted at 102 to an upright 104 which may form an integral part of a base 106 suitably secured to the shelf 26 of the cabinet 20.

A spring 108 urges the U-shape support 100 so as to force the member 90 against the flange of a record turntable.

The shaft 98 is driven by a flexible tube 110 of rubber or other suitable material which, in turn, is driven by the motor shaft 112 of the turntable motor 114 (Fig. 10) mounted upon a support 116 depending from the shelf 26. The motor shaft 112 is rigidly maintained against pivotal movement and the flexible tube 110 permits relative movement between the shaft 98 and the motor shaft 112. Upon the motor shaft 112 I provide the usual speed control mechanism 118 which is provided with a conventional type of manual control 120.

The reproducing mechanism of my new and improved phonograph comprises the usual needle 122 removably mounted in an electrical pick-up mechanism 124 which may be of any conventional or preferred design and which is carried on one end of a tone-arm 126 pivoted for vertical movement at 128 in a tubular housing 130. The tubular housing 130 is in turn, pivotally mounted on a supporting stand 132, the upper end of the housing 130 being maintained in proper alignment by a screw 134 adjustably carried on a U-shaped strap 136. The screw 134 has a conical end extending into a conical bearing surface in the upper end of the housing 130.

The tone-arm 126 carries a depending finger 138 which serves as a means for raising the needle 122 from the surface of the record which has just been played. The needle 122 is held in contact with a record by the weight of the pick-up mechanism 124, tone-arm 126 and depending finger 138. If these parts are of such weight as to press the needle 122 against the record with too great a force, a spring is inserted in the tubular housing 130 to exert an upward force on the pivoted tone-arm 126 so as to partially balance the weight of the tone-arm, depending finger, and reproducing mechanism, so that the needle 122 will rest upon the record with just the proper amount of force to give the best results.

In order to raise the needle 122 from the record, the depending finger 138 is moved to the position shown in Figs. 5 and 10 by means of a cam-shaped member 140 mounted on the end of a slide 142 mounted in a guide 144. The slide 142 is reciprocated by a bell crank lever 146 actuated by a rod 148 which is urged in one direction by a tension spring 150 (Fig. 6) extending from a depending pin 152 on the rod 148 to an upstanding pin 154 secured to the shelf 26. The rod 148 is moved in the opposite direction against the tension of the spring 150 by depending pins 156 carried by the plate 66 which engage the T head 158. Screws 160 function as guides for that end of the rod 148 adjacent the T head 158.

From an inspection of Fig. 5, it will be seen that the spring 150 acts in such a direction as to constantly urge the member 140 to tone-arm raising position. During the playing of a record this tendency of the spring is resisted by one of the pins 156 which is in such a position as to maintain the member 140 in retracted position during the record playing operation. The lower end of the finger 138 extends through an opening 162 in the base 106 and the shelf 26 is cut away adjacent the opening 162 to permit the end of the finger 138 to extend below the base 106. The opening 162 has a straight side 163 which serves as a guide for the finger 138 as the needle 122 is being returned to record playing position. The diagonal side 164 cooperates with member 140 to return the needle to initial position as it is raised, and curved surface 166 of member 140 tends to maintain the finger 138, and therefore needle 122, in such initial position.

The disk records in present commercial use are provided with needle grooves which have special termini which are free from recording characteristics and are provided solely for the purpose of actuating suitable mechanism to stop a phonograph after the needle of the machine has completely traversed the recording part of the needle groove. These needle groove termini are of two types, as most clearly shown in Fig. 3. In this figure the record indicated by reference numeral 88 has an elliptical needle groove terminus, whereas the record indicated by reference numeral 168 has a needle groove terminus comprising a small circle of shorter radius than the shortest radius of the ellipse of record 88. In my novel phonograph I utilize these needle groove termini for the purpose of actuating certain switch mechanism which will be hereinafter described, and in order to make a machine which can be used with all of the makes of disk records now in commercial use, it is necessary to provide mechanism which will react to both of these types of needle groove termini.

For this purpose I provide an arm 170 (Fig. 10) attached to the tubular housing 130 and which oscillates with said housing as the needle traverses the groove in the record disk. If the needle is traversing the groove of a record similar to the record indicated by reference numeral 168, the lower end of the arm 170 comes in contact with the sloping cam surface 172 of switch lever 174 (Fig. 11) as the needle enters the terminal portion of the record groove and moves the lever 174 against the tension of the spring 176 to engage the electrical contacts 178 and 180 for a purpose which will be hereafter described.

If, however, the machine is playing a record of the type indicated by the reference numeral 88, the arm 170 does not move far enough to bring it into engagement with the sloping cam 172 of the switch lever 174. The arm 170 only moves far enough to engage the pivoted dog 182 with the teeth 184 on the extreme end of the switch lever 174. As the dog 182 moves into engagement with the teeth 184, it assumes the position shown in Fig. 12. Thereafter the arm 170 oscillates back and forth as the needle traverses the elliptical terminus of the record groove, and this oscillation of the arm 170 causes the dog 182 to swing about its pivot as indicated in Fig. 12. As the point of the dog 182 reaches the lowest point in its swing, it depresses the toothed end of the switch lever 174 and brings the contacts 178 and 180 into engagement, thereby establishing an electrical circuit through these contacts.

In addition to the foregoing automatic means for closing the contacts 178 and 180, upon completion of a record, I provide manual means which can be operated at any time and without waiting for the completion of the entire record. This manual means, as shown in Figs. 5, 10 and 11, comprises a pin 186 supported in a U-shaped bracket 188 attached to the base 106. The pin 186 has a tapered end 190 which may be moved to a position beneath the switch lever 174, thereby raising the lever so that the contact 180 engages the contact 178. As shown in the drawings, the spring 192 normally positions the pin so that the tapered end 190 is spaced from the switch lever 174. The pin 186 extends through the cabinet 20 as shown in Fig. 3, and is provided with an enlarged head 194 which may be pushed inwardly by manual pressure to close the contacts 178, 180.

As shown in the circuit diagram of Fig. 15, the contacts 178, 180 control one of the circuits leading to the carrier motor 74 and initiate the record changing operation by automatically starting the carrier motor upon the completion of a record or by starting the carrier motor at any other time during the operation of the machine upon manual actuation of the pin 186 which likewise controls the contacts 178, 180.

The carrier motor is also controlled through a second circuit having a switch A indicated on the circuit diagram of Fig. 15 and shown more clearly in Fig. 5. This switch A comprises a movable lever 196 carrying a movable contact 198 which can be brought into engagement with a stationary contact 200. A spring 202 tends to maintain the contacts 198 and 200 in engagement with each other. When the slide 142 moves to the opposite extreme to that shown in Fig. 5, which occurs when the needle 122 is lowered to playing position, the slide 142 engages the end 204 of the lever 196 to move the contact 198 away from engagement with the contact 200.

Another feature of my invention is the mechanism for operating the master switch B which controls all of the circuits leading to the carrier motor 74, as well as the circuits leading to the turntable motor 114, the electrical amplifying mechanism 28, and the red light 24. The switch B comprises a lever 206 having a movable contact 208, connected with the house lighting circuit or other source of current supply, and a stationary contact 200 which is also the stationary contact of switch A and which is connected with circuits leading to the various devices previously named. A spring 210 tends to engage the movable contact 208 with the stationary contact 200.

The lever 206 is moved in the opposite direction against the tension of spring 210 by a rack 212 slidably mounted in a guide 214 carried by the base 106. A tension spring 216 engages a pin 218 on the base 106 and a second pin 220 on the rack 212 and tends to move it to the left as shown in Fig. 5. The rack 212 is moved to switch opening position and against the tension of the spring 216 by a dog 222 pivoted on the end of a pivoted lever 224. The dog 222 and lever 224 are normally held in the position shown by a spring 226 and are operated to advance the rack 212 one notch upon each reverse (leftward in Fig. 5) swing of a finger 228 on a swinging member 230 pivoted to the shelf 26 at 232. Every time the rod 148 is moved to the right, as shown in Fig. 5, by a pin 156 on plate 66, depending pin 152 moves swinging member 230 with it. On this movement of the member 230 finger 228 yields against the tension of spring 234 and does not actuate lever 224 and dog 222. On the reverse movement of rod 148, depending pin 236 moves the member 230 in the opposite direction, whereupon finger 228 oscillates lever 224 and causes dog 222 to advance rack 212 one notch to the right, as shown in Fig. 5. On this movement of the member 230, stop pin 238 prevents finger 228 from yielding as it contacts with lever 224.

Rack 212 is normally prevented from moving under the tension of spring 216 by an escapement lever 240 normally held in the position shown by a spring 242. The free end of the escapement lever 240 engages the pin 244 on the plunger 246 of a solenoid 248. The solenoid is controlled by a circuit having a normally open switch C which is momentarily closed when a coin passes down the coin chute 86. In this circuit I have shown an ordinary incandescent lamp 250 which serves as a resistance to limit the current flowing through the coil of the solenoid.

Each time a coin is inserted in the coin slot the solenoid is actuated to move the escapement lever 240 toward the left, as shown in Fig. 5, thus permitting the rack 212 to move one notch to the left under the action of its spring 216. This movement of the rack 212 permits spring 210 to close the master switch.

My new and improved phonograph is adapted to be operated from the usual electric lighting circuit of the house or building in which the machine is located and may be connected to such lighting circuit by means of the conventional flexible cable 254 (Figs. 2 and 13) which is provided with a suitable plug 256 for this purpose. I preferably mount the usual volume control 258 for the loud speaker in such a position that it is readily accessible from the outside of the cabinet. The details of a preferred arrangement of wiring are shown most clearly in Fig. 13 and includes a conveniently located plate 260 having suitable binding posts for the wires of the several circuits. The leads 262, 264 and 266 connecting with the coin controlled switch C, electrical amplifying mechanism 28, and red light 24, respectively, are preferably provided with coupling members 268 for removably connecting them with cooperating coupling members attached to the mechanism which they supply. It is to be understood, however, that my invention is not limited to this particular wiring arrangement and that other arrangements of wiring may be used.

The operation of my novel automatic phonograph is as follows:

The operator may inspect the list 64 and select the record which he desires to have played. He then turns the hand wheel 50 of the selector mechanism until the pointer 60 registers with the number on its dial corresponding to the number of the selected record appearing on the list 64.

The operator then drops a suitable coin into the upper end 86 of the coin chute. As the coin passes down the coin chute it momentarily engages the lever 252, thereby closing switch C and actuating the solenoid to move escapement lever 240 toward the left, as shown in Fig. 5. This permits spring 216 to move rack 212 one notch to the left, and spring 210 thereupon closes master switch B which starts turntable motor 114 and illuminates red light 24 and also closes the circuit to electrical amplifying mechanism 28. At this time the rod 148 and slide 142 are in the position shown in Fig. 5 and the switch A which controls one circuit leading to the carrier motor 74 is closed so that the carrier motor also starts immediately.

The carrier motor rotates the plate 66 and thereby turns the carrier 34 until the turntable bearing the selected record is moved to playing position, in which position the edge of the turntable engages and is driven by the driving member 90. As the turntable moves into engagement with the driving member 90, the driving member, its shaft 98, and supporting frame 100, will move slightly about the pivot 102 and against the tension of the spring 108 which will serve to hold the driving member 90 in frictional engagement with the periphery of the turntable. The flexible tube 110 will compensate for any angularity between the shaft 98 and the motor shaft 112.

As the carrier 34 moves to bring the desired record into playing position, cam 82 on gear wheel 70 moves from beneath bell crank lever 84, whereupon spring 80 moves stop 76 to active position where it engages the depending lug 76 corresponding to the selected record and prevents further rotation of carrier 34. In case no record has been selected the carrier 34 is automatically moved sufficiently to bring into playing position the record following the one which was previously played.

Continued rotation of plate 66 causes the bottom pin 156, as viewed in Fig. 5, to engage the T head 158 and move the rod 148 to the right, as viewed in said figure. This retracts the member 140 and permits the finger 138 on the tone-arm to be guided by the retiring member 140 and the straight surface 163, thereby lowering the needle 122 onto the record at the beginning of the record groove. The housing 130 which carries the tone-arm 126, is mounted at a slight angle so that the weight of the tone-arm 126, electrical pick-up 124 and finger 138, press the finger 128 against the straight edge 163 of the opening 162. This movement of the slide 142 continues until the slide engages the end 204 of lever 196, thereby opening the switch A and cutting off the current to the carrier motor which immediately stops, leaving the parts in this position.

This initiates the reproduction of the selection carried by the record which is in contact with the needle 122 and the needle completely traverses the groove of the record unless the pin 186 is manually operated to close the contacts 178, 180. When the needle 122 enters the terminus of the record groove the end of arm 170 contacts with sloping cam 172 on lever 174 to close the contacts 178, 180, if the terminus of the record groove is of the small circle type such as provided by the record 168. However, if the record has an elliptical terminus similar to that of the record 88, the dog 182 carried by arm 170 engages teeth 184 to close contacts 178, 180, as has previously been described herein.

Contacts 178, 180 control one of the circuits leading to the carrier motor 74 and when these contacts are closed the carrier motor begins to operate and rotates plate 66. As this plate rotates the pin 156 which is holding rod 148 to the right, as viewed in Fig. 5, is shifted to the position occupied by the upper pin 156 in Fig. 5, and during this movement of the plate 66 the rod 148 is returned to the position shown in Fig. 5 by the spring 150.

As the rod 148 returns, the slide 142 disengages the end 204 of switch lever 196 and permits spring 202 to close the switch A which controls a parallel circuit also leading to the carrier motor 74. As the slide 142 moves downward, as viewed in Fig. 5, the member 140 engages the depending finger 138 on the tone-arm 126 and moves it to the position shown in Fig. 5, thus raising the needle 122 from the record as shown in Fig. 10.

During the leftward movement of rod 148, as viewed in Fig. 5, pin 236 swings member 230 to the left and finger 228 strikes pivoted lever 224, causing dog 222 to advance rack 212 one notch to the right against the tension of its spring 216. If only one coin has been deposited in the machine, this movement of the rack 212 will open master switch B by swinging lever 206 about its pivot and disengaging contact 208 from contact 200. This opening of switch B cuts off the supply of current to both the turntable and carrier motors, thus stopping the entire mechanism, and also cuts off the current to red light 24 and electrical amplifying mechanism 28.

Just before the carrier motor 74 is stopped by the opening of switch B, cam 82 (Fig. 8) shifts bell crank 84 to retract stop 78 and carrier 34 is thereupon moved by the continued rotation of plate 66 to swing the record just played from beneath the needle 122. When the mechanism stops as the result of opening switch B, the carrier 34 is in such a position that the needle 122 is over the gap between the record just played and the succeeding record on the carrier 34.

If two or more coins are inserted in the coin chute in rapid succession, the rack 212 is moved to the left a number of notches corresponding to the total number of coins deposited. Each time a record is completed the rack 212 is moved to the right one notch by the dog 222 and the master switch B which stops the machine is not open until the machine has played the number of records corresponding to the number of coins deposited.

The prepayment current dispensing device disclosed in this application is claimed in my copending application, Serial No. 457,617, filed May 30, 1930, and the circuit controlling features and sequence of operation of my invention are more broadly claimed in my copending application, Serial No. 386,516, filed August 17, 1929.

The accompanying drawings and this specification illustrate and describe in detail only one embodiment of my invention, and it is to be understood that various modifications and changes may be made therein without departing from the scope of my invention which is defined solely by the following claims.

I claim:

1. In a phonograph of the class described, a carrier having means for supporting and moving a record disk in a predetermined plane and means for supporting and moving a second record disk in another plane parallel with the first said plane, a single reproducing mechanism, actuating means for said carrier for bringing each of said record disks into engagement with said reproducing mechanism while said discs remain in their respective planes, and means for driving the record disk being reproduced.

2. In a phonograph of the class described, a carrier comprising means for supporting and moving a plurality of record disks in a single predetermined plane and means for supporting and moving a plurality of record disks in a second plane parallel with the first said plane, a single reproducing mechanism, actuating means for said carrier for automatically bringing said records into engagement with said reproducing mechanism in seriatim while said discs remain in their respective planes, and means for driving the record disk in engagement with said reproducing mechanism.

3. In a phonograph of the class described, carrier mechanism adapted to hold and maintain a plurality of record disks in predetermined planes during operation of the phonograph, reproducing mechanism, automatic means for bringing said record disks into engagement with said reproducing mechanism in seriatim while said disks remain in their respective planes, manual means whereby an operator may selectively play any of the record disks on said carrier, and means for rotating the record disk in engagement with said reproducing mechanism.

4. In a phonograph of the class described, a turntable in each of two spaced parallel planes adapted to support a record disk, a member having a plurality of driving surfaces for selectively driving a turntable, a motor for driving said member, a yieldable connection between said motor and member permitting angular movement therebetween, and reproducing mechanism adapted to cooperate with a record disk carried on said turntable.

5. In a phonograph of the class described, carrier mechanism adapted to support and continuously maintain a record turntable at a certain level and a second record turntable at a different level during all shifting movements of said mechanism, means for rotatably shifting said mechanism, a single driving member for rotating each of said turntables, a prime mover for rotating said driving member, and reproducing mechanism adapted to cooperate with record disks mounted on said turntables.

6. In a phonograph of the class described, a rotatable carrier, a plurality of record turntables supported by said carrier in superposed parallel planes, said turntables being so supported that the planes of the respective turntables remain fixed, and bear a fixed relation to the horizontal, reproducing mechanism, selector mechanism for rotating said carrier in one direction only to bring record disks carried on said turntables into engagement with said reproducing mechanism, and means for selectively driving said turntables.

7. In a phonograph of the class described, a record turntable, a pivoted tone-arm carrying needle means adapted to cooperate with a record disk supported on said turntable, motor means for driving said turntable, and control means for said motor means actuated upon a predetermined angular movement of said tone-arm about its pivot and also upon an oscillatory movement of said tone-arm.

8. In an automatic phonograph of the class described, carrier mechanism adapted to support a plurality of record disks, movable reproducing mechanism, automatic means for moving said carrier mechanism and reproducing mechanism into and out of record playing position, and control means for said automatic mechanism responsive to extreme movement of said reproducing mechanism in one direction and responsive to a lesser oscillatory movement of said reproducing mechanism.

9. In an automatic phonograph of the class described, a carrier for supporting a plurality of record turntables in a plurality of fixed superposed planes, and maintaining the turntables in their respective planes while being carried, a single reproducing mechanism including a pivoted tone-arm carrying a needle adapted to engage with record disks carried on said turntables, a motor for driving said turntables, a switch controlling the supply of current to said motor, means for actuating said switch upon an angular movement of said tone-arm through a predetermined distance, and means for actuating said switch upon oscillatory movement of said tone-arm.

10. In a phonograph of the class described, a record turntable, a pivoted tone-arm carrying a needle adapted to cooperate with a record disk supported on said turntable, a motor for rotating said turntable, and mechanism controlling the supply of energy to said motor, said control mechanism including a pivoted lever having a cam surface and a serrated edge, an arm associated with said tone-arm and adapted to cooperate with said cam surface to shift said lever, and a pivoted dog mounted on said last-named arm adapted to cooperate with said serrated edge to shift said lever.

11. In a phonograph of the class described, a record turntable, means for driving said turntable, a tone-arm carrying a needle for engagement with a record disk supported on said turntable, a support for said tone arm, means pivoting said tone-arm to said support for oscillatory movement in a vertical plane to move said needle into and out of engagement with a record disk, a relatively stationary member having a surface adapted to guide said tone-arm as it is moved to bring said needle into engagement with a record disk, and means on said tone-arm cooperating with said guiding surface, for vertically oscillating said tone arm.

12. In a phonograph of the class described, a record turntable, means for rotating said turntable, a needle adapted to be brought into and out of engagement with a record disk supported on said turntable, needle supporting mechanism including a tone arm mounted for oscillatory movement in two intersecting planes a finger on said arm, means engaging said finger for vertically oscillating said arm and automatically moving said needle into and out of engagement with a record disk, and needle guide means cooperating with said finger.

13. In a phonograph of the class described, a record turntable, means for rotating said turntable, a needle carrying tone-arm pivoted for limited universal movement, a finger mounted on said tone-arm, means comprising an actuating element and a cooperating guide for moving said tone-arm away from a record disk by imparting limited universal movement to said tone arm and permitting the return of said tone-arm to said record disk, said tone-arm being held against said guide by the action of gravity.

14. In a phonograph of the class described, a record turntable, means for rotating said turntable, a needle carrying tone-arm mounted for pivotal movement about an axis in each of two intersecting planes for shifting into and out of record playing position, a relatively stationary member providing an opening, and a finger rigid with said tone-arm and projecting into said opening, said opening having a straight side for guiding said tone-arm as it is moved into record playing position and a diagonal side for guiding said tone-arm as it is moved out of record playing position, an actuating element engaging said finger, and a coil spring urging said actuating element toward said finger to actuate the same.

15. In a phonograph of the class described, a horizontally disposed rotatable carrier including a plurality of horizontally radiating arms, each said arm comprising a vertical extension at the outer end thereof, the extensions on alternate arms terminating in one plane and the extensions on the other arms terminating in another plane, means for supporting a record disk a predetermined distance above each of said extensions, a single reproducing mechanism, actuating means for said carrier for rotating the carrier to bring each of said record disks into playing position adjacent said reproducing mechanism while maintaining each of said disks constantly in the same plane, and means for rotating the record disk being reproduced.

16. In a phonograph of the class described, a horizontally disposed rotatable carrier including a plurality of horizontally radiating arms, each said arm comprising a vertical extension at the outer end thereof, the extensions on alternate arms terminating in one plane and the extensions on the other arms terminating in another plane, a turntable mounted on each of said extensions in overlapping relation for supporting record disks on alternate turntables in one plane and record disks on the other turntables in another plane parallel to the first said plane, means for imparting rotary movement to said carrier and turntables as a unit, means for selectively rotating each of said turntables individually, and a reproducer selectively engageable with the record disk on the turntable being individually rotated.

17. In a phonograph of the class described, a horizontally disposed rotatable carrier including a plurality of horizontally radiating arms, each said arm comprising a vertical extension at the outer end thereof, the extensions on alternate arms terminating in one plane and the extensions on the other arms terminating in another plane, a turntable mounted on each of said extensions in overlapping relation for supporting record disks on alternate turntables in one plane and record disks on the other turntables in another plane parallel to the first said plane, automatic means for rotating said carrier and moving said record disks in series into reproducing position, a reproducer engageable with each disk as it moves to reproducing position, means for rotating the record disk in engagement with said reproducer, and manual means whereby an operator may move the carrier to selectively place any of the disks in reproducing position.

18. In a phonograph of the class described, a record carrier, said carrier being mounted for rotation about a central pivotal axis, arms on said carrier extending radially at right angles to said pivotal axis, an extension on the outer extremity of each said arm, each alternate extension being of the same length and terminating in the same plane, the other extensions terminating in another plane parallel with the first said plane, turntables mounted on said extensions for rotation in parallel planes at right angles to planes passing through the pivotal axis of said carrier, said turntables being adapted to support record disks thereon, a reproducer, automatic means for bringing said record disks into engagement with said reproducer in series, manual means for selectively moving any of the record disks into engagement with the reproducer and means for rotating the record disk in engagement with said reproducer.

19. In a phonograph of the class described, a record carrier, said carrier being mounted for rotation about a central pivotal axis, arms on said carrier extending radially at right angles to said pivotal axis, an extension on the outer extremity of each said arm, each alternate extension being of the same length and terminating in the same plane, the other extensions terminating in another plane parallel with the first said plane, turntables mounted on said extensions for rotation in parallel planes at right angles to planes passing through the pivotal axis of said carrier, said turntables being disposed in overlapping relation with portions of the upper surface of the lower turntables exposed and adapted to support record disks thereon for engagement with reproducing mechanism, reproducing mechanism disposed adjacent said carrier, automatic means for bringing said record disks into engagement with said reproducing mechanism in series, manual means for selectively moving any of the record disks into engagement with the reproducing mechanism, and means for rotating the record disk in engagement with said reproducing mechanism.

20. In a phonograph of the class described, a turntable arranged to support a record disk, a member for driving said turntable contacting with the periphery thereof, a motor for driving said member, a yieldable connection between said motor and said member permitting angular movement therebetween, means for maintaining frictional contact between said member and the periphery of said turntable, and reproducing mechanism arranged to cooperate with the record disk carried on said turntable.

21. In a phonograph of the class described, a record turntable having a position of rotation, means for rotating said turntable, a tone arm carrying a needle for engagement with the record disk supported on said turntable, a member in which said tone arm is pivoted, a finger depending from said tone arm between said pivoted point and said needle, and means contacting with said finger for raising said tone arm when said turntable is moved out of its position of rotation.

In witness whereof, I hereunto subscribe my name this 7th day of May, 1930.

ARVID DAHLSTROM.